United States Patent
Nozawa et al.

(10) Patent No.: US 10,530,557 B2
(45) Date of Patent: Jan. 7, 2020

(54) RADIO BASE STATION AND COMMUNICATION SYSTEM

(71) Applicant: Mitsubishi Electric Corporation, Tokyo (JP)

(72) Inventors: Haruka Nozawa, Tokyo (JP); Noriyuki Fukui, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 98 days.

(21) Appl. No.: 15/769,454

(22) PCT Filed: Dec. 25, 2015

(86) PCT No.: PCT/JP2015/086385
§ 371 (c)(1),
(2) Date: Apr. 19, 2018

(87) PCT Pub. No.: WO2017/109982
PCT Pub. Date: Jun. 29, 2017

(65) Prior Publication Data
US 2018/0309561 A1    Oct. 25, 2018

(51) Int. Cl.
*H04L 5/14* (2006.01)
*H04W 16/28* (2009.01)
(Continued)

(52) U.S. Cl.
CPC .......... *H04L 5/14* (2013.01); *H04W 16/28* (2013.01); *H04W 72/04* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 10,187,839 B2 * | 1/2019 | Fu | H04W 36/18 |
| 10,200,975 B2 * | 2/2019 | Shen | H04B 17/391 |

(Continued)

FOREIGN PATENT DOCUMENTS

| | | |
|---|---|---|
| WO | WO 2013/145047 A1 | 10/2013 |
| WO | WO 2015/033929 A1 | 3/2015 |

OTHER PUBLICATIONS

Samsung, Nokia Networks. "Revised SID: Study on Elevation Beamforming / Full-Dimension (FD) MIMO for LTE." RP-141831. 3GPP TSG RAN Meeting #66. Maui, USA, Dec. 8-11, 2014.

*Primary Examiner* — Mohammad S Adhami
(74) *Attorney, Agent, or Firm* — Mitsubishi, Stewart, Kolasch & Birch, LLP

(57) ABSTRACT

A radio base station of a communication system communicates with mobile stations by using a beam, the system employing a time division multiplex scheme. The base station includes an information-reception-frequency calculator that determines, on a per mobile-station basis, frequencies of reception of feedback information from the mobile stations, a position determiner that determines in which region of plural regions obtained by dividing an area covered by the base station, the mobile stations are present, and a parameter determiner that determines whether it is necessary to change a communication parameter, based on the number of the mobile stations for which the frequencies are equal to or smaller than a threshold, the number of the regions where the mobile stations exist, and an average of the number of the mobile stations allocated to one slot for uplink communication, the parameter affecting frequencies with which the mobile stations transmit the information, the parameter determiner determining a new value of the parameter.

14 Claims, 9 Drawing Sheets

(51) Int. Cl.
*H04W 72/04* (2009.01)
*H04W 88/08* (2009.01)

(56) References Cited

U.S. PATENT DOCUMENTS

| | | | |
|---|---|---|---|
| 2009/0201861 A1* | 8/2009 | Kotecha | H04L 1/0027 370/329 |
| 2010/0091893 A1* | 4/2010 | Gorokhov | H04L 1/0026 375/260 |
| 2015/0215793 A1* | 7/2015 | Siomina | G01S 5/0205 455/456.1 |
| 2016/0205667 A1 | 7/2016 | Shen et al. | |

* cited by examiner

| MOBILE STATION ID | PRIORITY | FEEDBACK INFORMATION TRANSMISSION FREQUENCY |
|---|---|---|
| AAAA | HIGH | AA/1Frame |
| BBBB | LOW | BB/1Frame |
| ... | ... | ... |

FIG.8

| COMPARISON TARGET INFORMATION | THRESHOLD |
|---|---|
| FEEDBACK INFORMATION TRANSMISSION FREQUENCY | Tt[TIMES] |
| NUMBER OF MOBILE STATIONS FOR WHICH FEEDBACK INFORMATION TRANSMISSION FREQUENCIES ARE EQUAL TO OR SMALLER THAN THRESHOLD Tt [TIMES] | Tu |
| NUMBER OF REGIONS WHERE MOBILE STATIONS ARE PRESENT | Tg |
| AVERAGE OF NUMBER OF MOBILE STATIONS ALLOCATED TO ONE UL SLOT | Ts |

RADIO BASE STATION AND COMMUNICATION SYSTEM

FIELD

The present invention relates to a radio communication station to communicate with a mobile station, and a communication system.

BACKGROUND

In recent years, mobile stations represented by cellular phones have been spread, the market of the mobile communication systems have been expanded, and services of the mobile communication systems have been diversified. The $3^{rd}$ Generation Partnership Project (3GPP) standardizes Long-Term Evolution (LTE) and LTE-Advanced, which is one of advanced wireless access technologies for the fourth-generation mobile communication technology, for the purpose of achieving high-speed large-capacity communication.

The LTE-Advanced includes a new function called Dual Connectivity (DC). The DC is a function for achieving large-capacity communication in which a Master evolved Node B (MeNB) is responsible for mobility and wireless resource management and a Secondary evolved Node B (SeNB) is responsible for only user data communication. However, the user data communication is possible in the MeNB as well.

To further increase the communication capacity, a locally operated base station, that is, a base station that covers a small area such as the SeNB is expected to use a high-frequency band. Implementation of a beam forming function is examined for the purpose of loss compensation because a radio wave propagation loss is larger in a higher frequency band. The beam forming function, which uses the beam having a high directivity, changes the direction of the beam where appropriate such that a mobile station that communicates with the base station obtains a high gain, thereby achieving the satisfactory communication. For example, Patent Literature 1 discloses a radio base station that changes, where appropriate, the parameters used for the beam forming and the like in accordance with the change in the surrounding environment.

CITATION LIST

Patent Literature

Patent Literature 1: WO 2015/033929

SUMMARY

Technical Problem

The next generation wireless communication is expected to employ Time Division Duplex (TDD) for performing communications in uplink and downlink directions using the same frequency in a time division manner. The next generation wireless communication is requested to achieve a high downlink (DL) throughput, that is, increase a throughput in downlink communication, which is the communication from the base station to the mobile station. To this end, the next generation wireless communication gives a priority to establishing a sufficient time for transmitting a signal in a downlink direction (hereinafter, DL transmission), in scheduling for allocating wireless resources to mobile stations. As a result, the number of slots for downlink communication (hereinafter, DL slots) and slots for uplink communication (hereinafter, uplink (UL) slots) defining one wireless frame is set to make the number of DL slots greater, and thus the number of the set UL slots is smaller.

For that reason, when the number of mobile stations in the area covered by the base station is large, a frequency with which the base station collects from each mobile station the information concerning the status of each mobile station is likely to decrease. When the frequency with which the base station collects from each mobile station the information concerning the status of each mobile station decreases, it is difficult for the base station to act in response to the status of each mobile station, in particular, to control the beam and select the modulation scheme and the encoding rate, which results in the deterioration of the communication quality.

The present invention has been devised in view of the above, and an object of the present invention is to obtain a radio base station capable of preventing the deterioration of the quality of communication with mobile stations.

Solution to Problem

To solve the problems and achieve the object, the present invention provides a radio base station of a communication system employing a time division multiplex scheme, the radio base station communicating with mobile stations by using a beam. The radio base station comprises: an information-reception-frequency calculating unit to determine, on a per mobile-station basis, frequencies of reception of feedback information from the mobile stations, the feedback information including at least one kind of information among information necessary for forming the beam, information necessary for determining a modulation scheme in use, and information necessary for determining an encoding rate in use; and a position determining unit to determine in which region of a plurality of regions obtained by dividing an area covered by the radio base station, the mobile stations are present. The radio base station further comprises a parameter determining unit to determine whether it is necessary to change a communication parameter, on a basis of the number of the mobile stations for which the frequencies determined by the information-reception-frequency calculating unit are equal to or smaller than a threshold, the number of the regions where the mobile stations are present, and an average of the number of the mobile stations allocated to one slot for uplink communication, the communication parameter affecting frequencies with which the mobile stations transmit the feedback information, the parameter determining unit determining a new setting value of the communication parameter when it is necessary to change the communication parameter.

Advantageous Effects of Invention

The radio base station according to the present invention achieves the effect of preventing the deterioration of the quality of communication with the mobile stations.

BRIEF DESCRIPTION OF DRAWINGS

FIG. 8 is a diagram illustrating thresholds used by the parameter determining unit according to the first embodiment.

DESCRIPTION OF EMBODIMENTS

Radio base stations and communication systems according to embodiments of the present invention are explained in detail below with reference to the drawings. Note that the present invention is not limited by the embodiments.

First Embodiment

Figure 1:
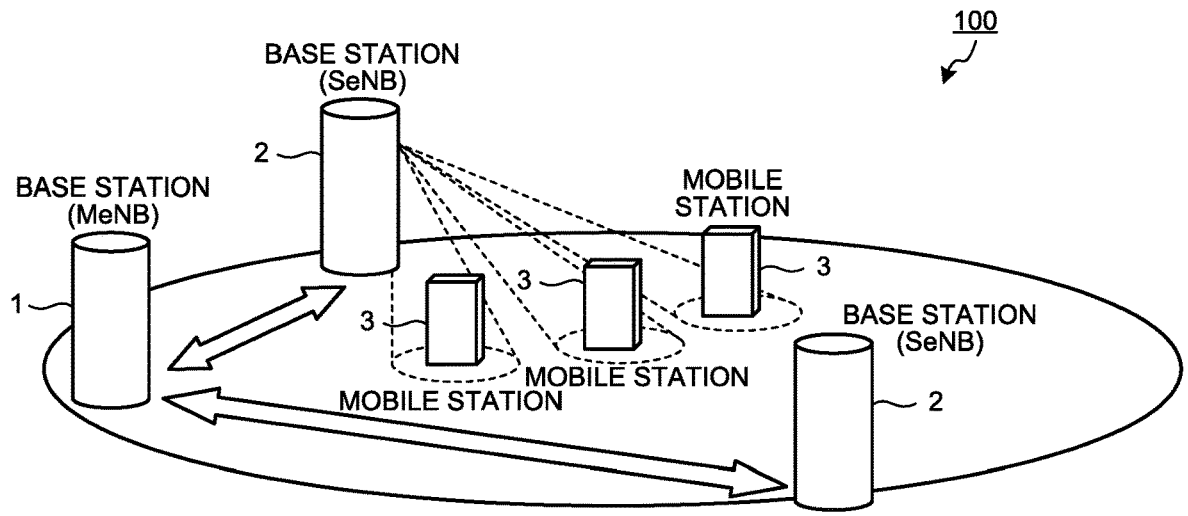
FIG. 1 is a diagram illustrating a configuration example of a communication system including a radio base station according to a first embodiment of the present invention.

FIG. 1 is a diagram illustrating a configuration example of a communication system including a radio base station according to a first embodiment of the present invention. A communication system 100 illustrated in FIG. 1 includes one base station 1 and two base stations 2. Note that the number of base stations of the communication system 100 is not limited to this. The base station 1 is a base station for macrocell and is, for example, a Master evolved Node B (MeNB) defined by Long-Term Evolution (LTE). The base station 2 is a base station for small cell and is, for example, a Secondary evolved Node B (SeNB) defined by the LTE. In FIG. 1, coverage of the base station 1, that is, an area covered by the base station 1 is indicated by a solid line. The coverage of the base station 1 and coverage of the base station 2 overlap. The base station 1 and the base stations 2 are in a superimposed relation on a network.

In the communication system 100 illustrated in FIG. 1, the base station 1 communicates by wire with each of the base stations 2 that are in a superimposed relation with the base station 1 on the network. The base station 1 is capable of communicating by radio with three mobile stations 3 present in the coverage of the base station 1. Each of the base stations 2, which are the radio base stations, is capable of communicating by radio with the mobile stations 3 present in the coverage of the base station 2, by using beams. In FIG. 1, beams formed by the base station 2 are indicated by dotted lines. Although FIG. 1 illustrates an example in which one of the two base stations 2 is communicating with the three mobile stations 3, the mobile stations 3 are connectable to both of the two base stations 2. Thus, the illustrated three mobile stations 3 are capable of performing wireless communication with all of the one base station 1 and the two base stations 2 illustrated in the figure. In the communication system 100 according to this embodiment, the base stations 1 and 2 perform communication with the mobile stations 3 in accordance with Time Division Duplex (TDD).

The base station 2 forms, on the basis of feedback information received from a mobile station 3 that is a counterpart for communication with such a base station 2, a beam toward this counterpart mobile station 3 that is a source of transmission of this feedback information. When detecting a decrease in a reception frequency of the feedback information, the base station 2 executes processing for increasing the reception frequency of the feedback information. Processing for increasing the reception frequency of the feedback information is explained hereinafter.

Figure 2:
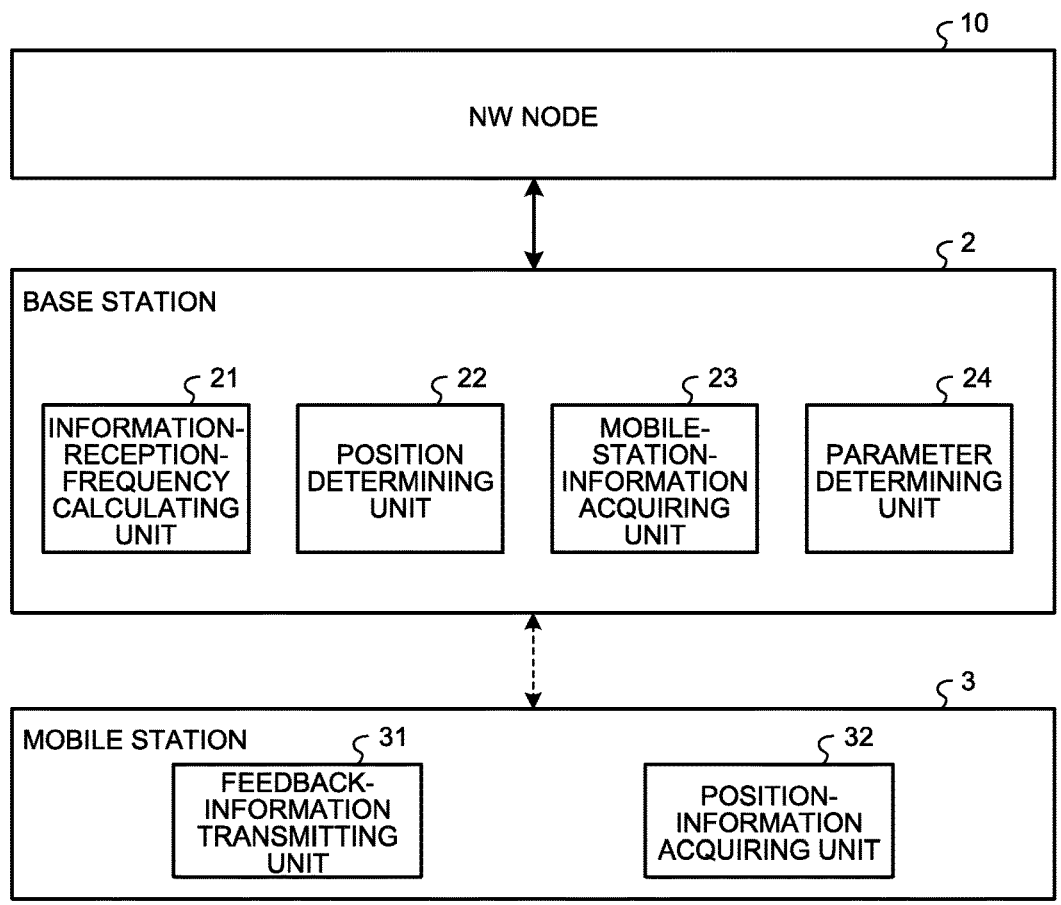
FIG. 2 is a diagram illustrating a configuration example of a mobile station and a base station of a communication system according to the first embodiment.

FIG. 2 is a diagram illustrating a configuration example of the mobile station 3 and the base station 2 of the communication system 100 according to the first embodiment. FIG. 2 omits illustration of the base station 1, which is the MeNB. Note that a NW node 10 illustrated in FIG. 2 is a network node not illustrated in FIG. 1 illustrating the configuration example of the communication system 100. The NW node 10 is, for example, a communication apparatus connected to a core network. The NW node 10 includes, for example, a host apparatus that controls the base station 2. The NW node 10 may include the base station 1. The mobile station 3 and the base station 2 perform communication by radio with each other and transmit user data and control signal. The base station 2 and the NW node 10 perform communication by wire with each other and transmit user data and control signal. Note that, in FIG. 2, a dotted line represents a wireless communication path and a solid line represents a wired communication path.

The base station 2 includes an information-reception-frequency calculating unit 21, a position determining unit 22, a mobile-station-information acquiring unit 23, and a parameter determining unit 24. The mobile station 3 includes a feedback-information transmitting unit 31 and a position-information acquiring unit 32.

The operations of the units defining the base station 2 are explained hereinbelow.

The information-reception-frequency calculating unit 21 of the base station 2 calculates, that is, determines a frequency of reception of feedback information from each mobile station 3 that is in communication therewith. When there is a plurality of communicating mobile stations 3, the information-reception-frequency calculating unit 21 calculates the reception frequency of the feedback information on a per mobile-station basis. The feedback information is information necessary in processing for improving or maintaining wireless communication quality such as processing for forming a beam in use, processing for determining a modulation scheme in use, and processing for determining an encoding rate in use. Although the feedback information can be, for example, information concerning the position of the mobile station 3 (hereinafter, position information), ACK and NACK indicating a reception result of data, a Channel Quality Indicator (CQI) indicating channel reception quality, and Channel State Information (CSI) indicating a state of a transmission path, the feedback information is not limited to these kinds of information. The position information on the mobile station 3 is information necessary for forming a beam, specifically, information necessary in processing for adjusting a direction in which the beam is formed. The ACK and the NACK, the CQI, and the CSI are information necessary for determining a modulation scheme and an encoding rate. The feedback information includes at least one kind of information among information necessary in the processing for forming a beam in use, information necessary in the processing for determining a modulation scheme in use, and information necessary in the processing for determining an encoding rate in use.

Figure 3:
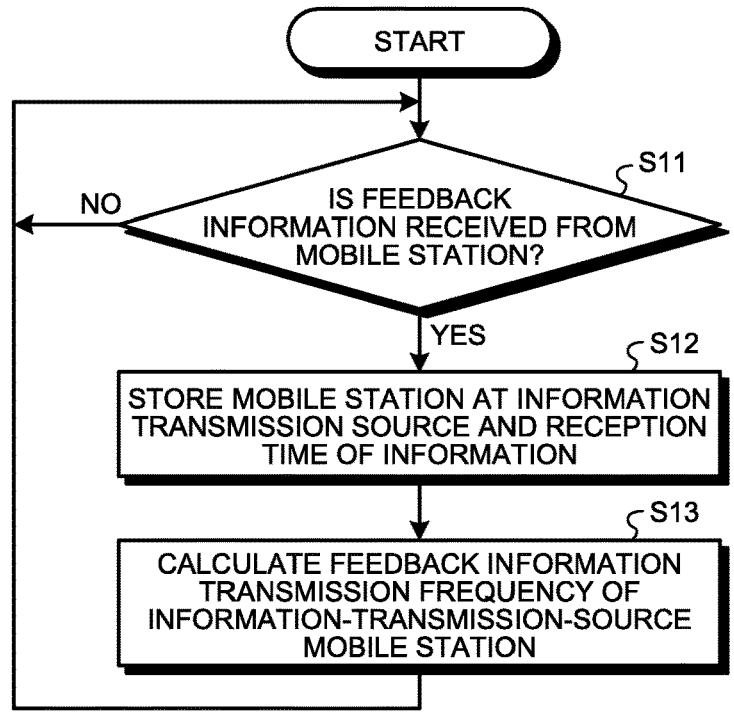
FIG. 3 is a flowchart illustrating an operation example of an information-reception-frequency calculating unit according to the first embodiment.

FIG. 3 is a flowchart illustrating an operation example of the information-reception-frequency calculating unit 21.

The information-reception-frequency calculating unit 21 checks whether feedback information is received from the mobile station 3 (step S11). When the feedback information is not received (No at step S11), the information-reception-frequency calculating unit 21 continues the checking operation. When receiving the feedback information (Yes at step S11), the information-reception-frequency calculating unit 21 stores a mobile-station ID and a reception time of the feedback information (step S12). The mobile-station ID is identification information of the mobile station 3 that is the source of transmission of the feedback information. Subsequently, the information-reception-frequency calculating unit 21 calculates a frequency with which the mobile station 3 transmits the feedback information, the mobile station being the source of the feedback information (step S13). The frequency of the transmission of the feedback information is hereinafter referred to as feedback information transmission frequency. For example, the feedback information transmission frequency is defined as the number of times of reception of the feedback information within a fixed time in the past. The feedback information transmission frequency may be defined as the result obtained by dividing the number of times of reception of the feedback information in an n wireless frame time by n, where n is a positive integer and the n wireless frame time is the fixed time in the past. The information-reception-frequency calculating unit 21 can calculate an average of time intervals of reception of the feedback information as the feedback information transmission frequency. The information-reception-frequency calculating unit 21 retains the feedback information transmission frequency calculated at step S13, as a latest feedback information transmission frequency.

Figure 4:
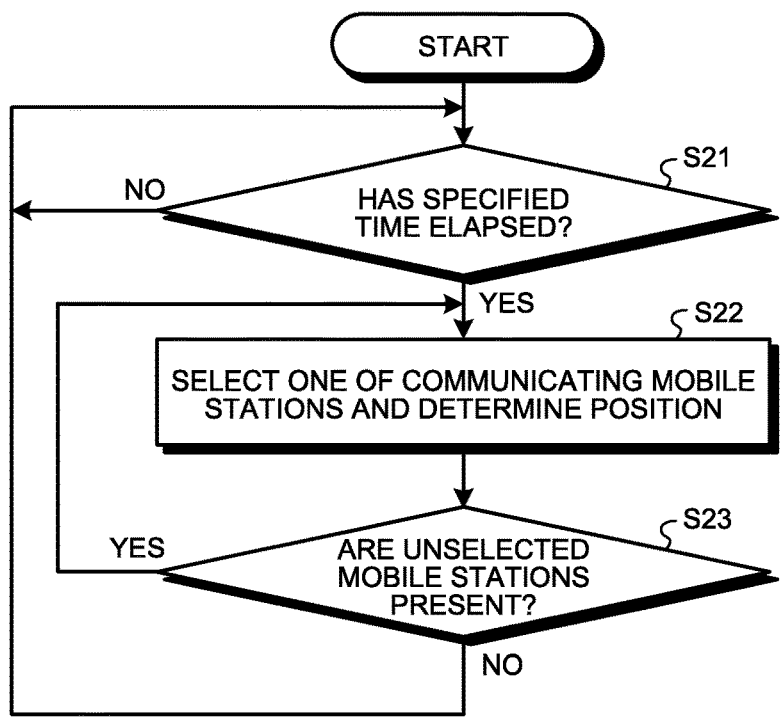
FIG. 4 is a flowchart illustrating an operation example of a position determining unit according to the first embodiment.

The position determining unit 22 of the base station 2 determines the positions of the communicating mobile stations 3. Specifically, the position determining unit 22 determines in which region of a plurality of regions obtained by dividing the coverage the communicating mobile stations 3 are present. The coverage is an area that can be covered by adjusting the direction of a beam formed by the base station 2. The base station 2 can form beams toward the mobile stations 3 present in the coverage and communicate with the mobile stations 3. FIG. 4 is a flowchart illustrating an operation example of the position determining unit 22.

The position determining unit 22 checks whether a specified time has elapsed (step S21). When the specified times has not elapsed (No at step S21), the position determining unit 22 continues the checking operation. When the specified time has elapsed (Yes at step S21), the position determining unit 22 selects one of the communicating mobile stations 3 and determines the position of the selected mobile station 3 (step S22). Subsequently, the position determining unit 22 checks whether unselected mobile stations 3, that is, the mobile stations 3 having their positions not specified yet, are present (step S23). When the unselected mobile stations 3 are present (Yes at step S23), the position determining unit 22 returns to step S22 and selects the mobile station 3 and determines the position of the selected mobile station 3. In this case, the position determining unit 22 selects one of the unselected mobile stations 3 and determines the position of the selected mobile station 3. On the other hand, when the unselected mobile stations 3 are absent (No at step S23), the position determining unit 22 returns to step S21 and continues the operation.

An example of an operation of the position determining unit 22 for determining the position of the mobile station 3 at step S22 is explained. For example, the position determining unit 22 acquires information concerning reception intensity of a signal from the mobile station 3, the signal being transmitted by the position determining unit 22 forming a beam toward each of a predetermined plurality of regions. The position determining unit 22 then determines the position of the mobile station 3 on the basis of the acquired reception intensity. The predetermined plurality of regions is regions obtained by dividing the coverage. Areas of the regions are not limited to being equal to one other. The position determining unit 22 determines that the mobile station 3 is present in a region indicated by a directivity direction of the beam corresponding to the highest one of the reception intensities indicated by the information concerning the reception intensities acquired from this mobile station 3. The base station 2 can transmit downlink reference signals having different IDs for different regions and cause the mobile station 3 to measure the reference signals. The downlink reference signal is a signal unique to each region transmitted to the region at a frequency and timing set in advance. The signal includes an ID corresponding to the region. The mobile station 3 reads this ID, and measures as the reception intensity a reception power value of the downlink reference signal including the ID. The mobile station 3 measures the reception intensity every time the mobile station 3 receives the downlink reference signal and reports the reception intensity and the ID to the position determining unit 22 of the base station 2, associating the reception intensity and the ID with each other. After measuring each of the reception intensities of the plurality of downlink reference signals transmitted by the different beams, the mobile station 3 can report to the position determining unit 22 of the base station 2 an ID of a downlink reference signal having the highest reception intensity, as position information on the mobile station 3 with the ID being associated with the reception intensity. A frequency and timing of transmission of the downlink reference signal by the base station 2 is notified from the base station 2 to the mobile station 3 in control signal. A measurement result of the reception intensity is notified from the mobile station 3 to the base station 2 in control signal.

Note that, when each mobile station 3 has a function of specifying its own position, the position determining unit 22 can collect position information from each mobile station 3 and determine, from the collected position information, the position of the mobile station 3, that is, the regions where the mobile station 3 is present.

The mobile-station-information acquiring unit 23 of the base station 2 acquires information concerning each of the covered mobile stations 3 from the mobile station 3. The information which the mobile-station-information acquiring unit 23 acquires from the mobile station 3 is, for example, a mobile-station ID, which is identification information on the mobile station 3, and a priority of the mobile station 3. The priority is information taken into consideration in scheduling for allocating a communication resource to the mobile station 3. A UL slot is more preferentially allocated to the mobile station 3 having a high priority than to the mobile station 3 having a low priority. That is, the mobile station 3 having the high priority is given more transmission opportunities of an uplink signal than the mobile station 3 having the low priority is. Note that, in some case, the priority is taken into consideration in determining whether to permit connection to the base station 2 when the base station 2 receives from the mobile station 3 a request for such a connection. In the following explanation, the information which the mobile-station-information acquiring unit 23 acquires from the mobile station 3 is referred to as "mobile station information". For example, when the mobile station 3 starts connection to the base station 2 after the mobile station 3 moves into the coverage of this base station 2, the mobile-station-information acquiring unit 23 acquires from the connection-starting mobile stations 3 the mobile station information including the information such as the mobile station IDs and the priority. When the mobile station 3 executes handover from another base station 2 to the base station 2, the mobile-station-information acquiring unit 23 can acquire the mobile station information from the other base station, that is, from the other base station 2 connected to the mobile station 3 before the execution of the handover.

Figures 5, 6:
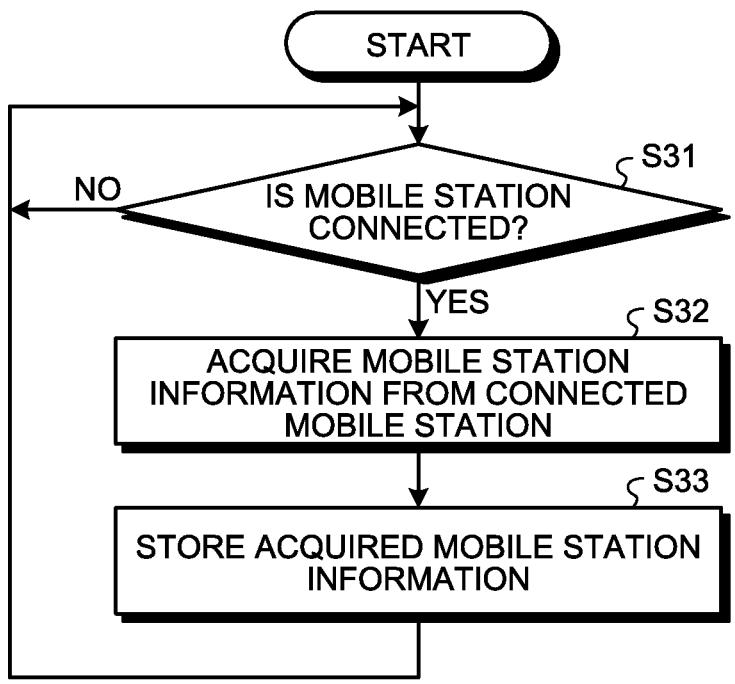
FIG. 5 is a flowchart illustrating an operation example of a mobile-station-information acquiring unit according to the first embodiment.
FIG. 6 is a diagram illustrating an example of a method of storing a feedback information transmission frequency and mobile station information.

FIG. 5 is a flowchart illustrating an operation example of the mobile-station-information acquiring unit 23.

The mobile-station-information acquiring unit 23 checks whether the mobile station 3 is connected to the base station (step S31). When the mobile station 3 is not connected to the base station (No at step S31), the mobile-station-information acquiring unit 23 continues the checking operation. The operation for checking whether the mobile station 3 is connected to the base station is, for example, an operation for checking whether the mobile station 3 which has been connected to another base station 2 moves into the coverage of the base station 2 and starts the connection to the base station 2 having this coverage or an operation for checking whether a power supply of the mobile station 3 is turned on in the coverage of the base station 2 and the mobile station 3 starts connection to the base station 2. When the mobile station 3 is connected to the base station (Yes at step S31), the mobile-station-information acquiring unit 23 acquires mobile station information from the mobile station 3 connected to the base station 2 and stores the mobile station information (steps S32 and S33). After storing the mobile station information, the mobile-station-information acquiring unit 23 returns to step S31, and checks whether the mobile station 3 is connected to the base station.

The base station 2 can convert the feedback information transmission frequency calculated by the information-reception-frequency calculating unit 21 and the mobile station information acquired by the mobile-station-information acquiring unit 23, into a table and store the feedback information transmission frequency and the mobile station information. FIG. 6 is a diagram illustrating an example of a method of storing the feedback information transmission frequency and the mobile station information. As illustrated in FIG. 6, the base station 2 can store as the table the mobile station ID, the priority, and the feedback information transmission frequency in association with one another. FIG. 6 illustrates an example in which the mobile station information is the mobile station ID and the priority. In the example illustrated in FIG. 6, the mobile stations 3 have two, "high" and "low" priorities. The feedback information transmission frequency is the number of times of reception of feedback information per one wireless frame time. The mobile station 3 having the high priority is the mobile station 3 that should be preferentially allocated communication resources, that is, a UL slot and a DL slot. More communication resources are allocated to the mobile station 3 having the high priority than to the mobile station 3 having the low priority.

On the basis of the frequency with which each communicating mobile station 3 transmits the feedback information, that is, the feedback information transmission frequency calculated by the information-reception-frequency calculating unit 21 and the number of regions where the communicating mobile stations 3 are present, the parameter determining unit 24 of the base station 2 determines setting values of one or more of communication parameters that affect the frequency with which the mobile station 3 transmits the feedback information. The number of regions where the communicating mobile stations 3 are present can be calculated on the basis of the positions of the respective mobile stations 3 specified by the position determining unit 22. The communication parameters that affect the frequency with which the mobile station 3 transmits the feedback information are separately explained.

Figure 7:
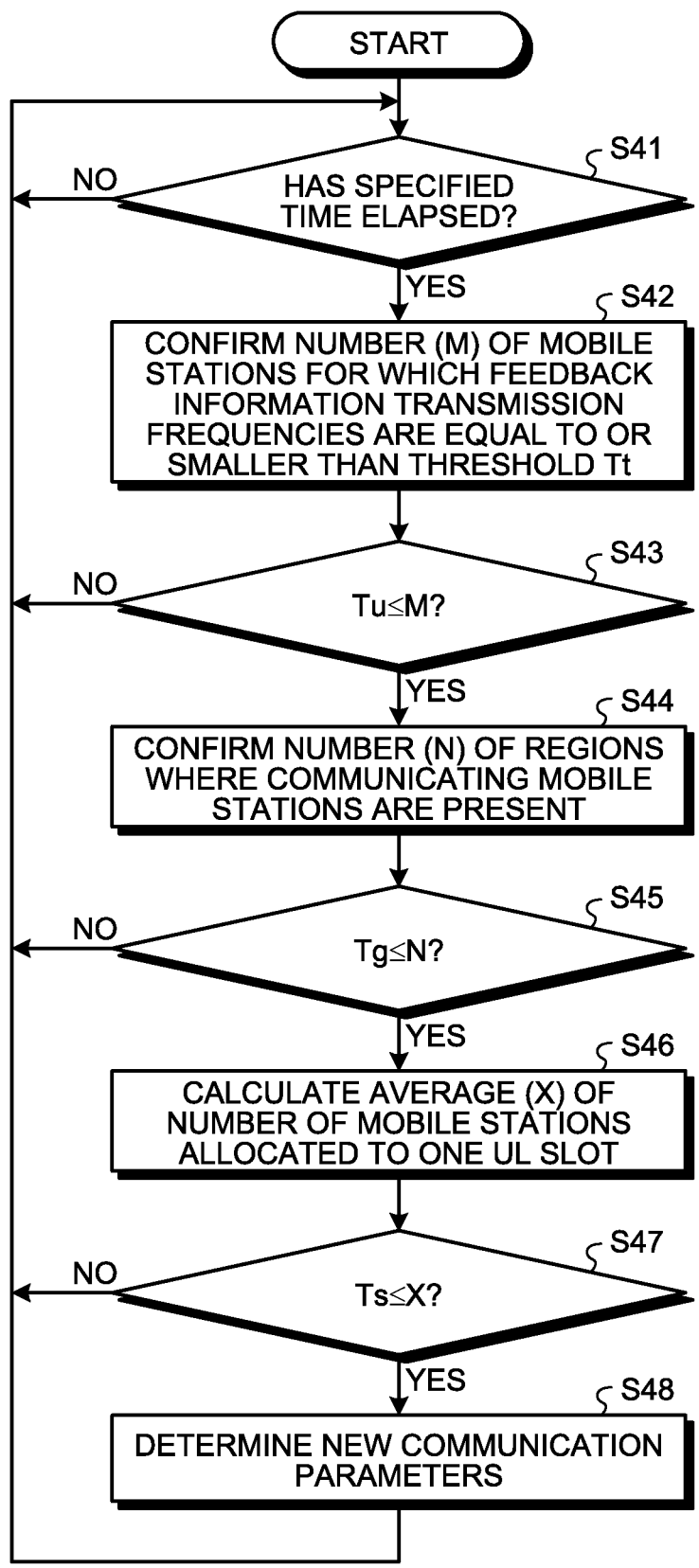
FIG. 7 is a flowchart illustrating an operation example of a parameter determining unit according to the first embodiment.

FIG. 7 is a flowchart illustrating an operation example of the parameter determining unit 24. FIG. 8 is a diagram illustrating thresholds used by the parameter determining unit 24 when the parameter determining unit 24 executes the operation illustrated in FIG. 7. The parameter determining unit 24 determines whether a change to the communication parameters is necessary, by executing the processing for comparing a threshold Tt[times] with the feedback information transmission frequency for each mobile station 3, the processing for comparing a threshold Tu with the number of the mobile stations 3 for the feedback information transmission frequencies are equal to or smaller than the threshold Tt [times], the processing for comparing a threshold Tg with the number of regions where the mobile stations 3 are present, and the processing for comparing a threshold Ts with an average of the number of the mobile stations 3 allocated to one UL slot. When the change is necessary, the parameter determining unit 24 executes the processing for changing the communication parameters. This operation is explained below.

The parameter determining unit 24 checks whether a specified time has elapsed (step S41). When the specified time has not elapsed (No at step S41), the parameter determining unit 24 continues the checking operation. When the specified time has elapsed (Yes at step S41), the parameter determining unit 24 confirms the number M of the mobile stations 3 for which the feedback information transmission frequencies are equal to or smaller than the threshold Tt (step S42). Subsequently, the parameter determining unit 24 checks whether the number M of the mobile stations 3 for which the feedback information transmission frequencies are equal to or smaller than the threshold Tt is equal to or larger than the threshold Tu (step S43). When the number M is smaller than the threshold Tu, M<Tu (No at step S43), the parameter determining unit 24 returns to step S41. When the number M is equal to or larger than the threshold Tu, Tu≤M (Yes at step S43), the parameter determining unit 24 confirms the number N of regions where the communicating mobile stations 3 are present (step S44) and checks whether the number N of regions where the communicating mobile stations 3 are present is equal to or larger than the threshold Tg (step S45). When the number N is smaller than the threshold Tg, N<Tg (No at step S45), the parameter determining unit 24 returns to step S41. When the number N is equal to or larger than the threshold Tg, Tg≤T (Yes at step S45), the parameter determining unit 24 calculates an average X of the number of the mobile stations 3 allocated to one UL slot (step S46) and checks whether the calculated average X is equal to or larger than the threshold Ts (step S47). When the average X is smaller than the threshold Ts, X<Ts (No at step S47), the parameter determining unit 24 returns to step S41. When the average X is equal to or larger than the threshold Ts, Ts≤X (Yes at step S47), the parameter determining unit 24 determines new communication parameters, that is, new setting values of the communication parameters that affect the feedback information transmission frequencies for the mobile stations 3 (step S48). After executing step S48, the parameter determining unit 24 returns to step S41. At step S48, the parameter determining unit 24 determines the communication parameters so as to increase the feedback information transmission frequency for each mobile station 3 for which the feedback information transmission frequency is equal to or smaller than the threshold Tt.

Note that, in the example illustrated in FIG. 7, step S48 is executed both when the number N of regions where the communicating mobile stations 3 are present is equal to or larger than the threshold Tg and when the average X of the number of the mobile stations 3 allocated to one UL slot is equal to or larger than the threshold Ts. However, step S48 can be executed either when the number N of the regions is equal to or larger than the threshold Tg or when the average X is equal to or larger than the threshold Ts.

The communication parameters having their values to be determined at step S48 by the parameter determining unit 24 are explained next. Increasing a frequency of allocation of UL slots to the mobile station 3 suffices to increase the feedback information transmission frequency for this mobile station 3. For example, when the configuration of one wireless frame, that is, the number of DL slots and the number of UL slots that define the one wireless frame are modified to increase the number of UL slots per one wireless frame, a frequency of allocation of UL slots to the mobile station 3 can be increased. When the priority of the mobile station 3 is low, the frequency of allocation of the UL slots can be increased by increasing the priority of this mobile station. When there are a plurality of the mobile stations 3 having high priorities y, a frequency of allocation of UL slots to the mobile stations 3 having the high priorities can be increased by reducing the priorities of some of the mobile stations 3. For example, when the feedback information transmission frequency for the mobile station 3 having the high priority is desired to be increased and there exists another high-priority mobile station 3 having no problems even if the feedback information transmission frequency for this latter high-priority mobile station decreases, a frequency of allocation of UL slots to the former mobile station 3 for which the feedback information transmission frequency is desired to be increased can be increased by reducing the priority of the latter mobile station 3 having no problems even if the feedback information transmission frequency for the latter mobile station decreases. The mobile station 3 having no problem even if the feedback information transmission frequency for this mobile station decreases is, for example, the mobile station 3 for which the feedback information transmission frequency is larger than the threshold Tt. When the number of the communicating mobile stations 3 becomes smaller, a frequency of allocation of UL slots to the mobile station 3 can be increased. For example, when there is another mobile station 3 that uses the same beam as the beam of the mobile station 3 for which the feedback information transmission frequency is desired to be increased, the beam used by the other mobile station 3 is changed to thereby increase the frequency of allocation of UL slots to the mobile station 3 for which the feedback information transmission frequency is desired to be increased.

Therefore, at step S48 explained above, the parameter determining unit 24 determines a new setting value concerning at least one of communication parameters related to various operations such as the configuration of the wireless frame, the priority of the mobile station 3, and allocation of a beam to each mobile station 3 such that the frequency of allocation of UL slots to the mobile station 3 for which the feedback information transmission frequency is equal to or smaller than the threshold Tt is higher than in the past. When the parameter determining unit 24 determines the new setting value of the communication parameter, that is, when the communication parameters are updated, the respective units of the base station 2 perform their operations in accordance with the updated communication parameters. For example, when the configuration of the wireless frame is changed, a scheduler not illustrated in FIG. 2 allocates UL slots and DL slots of the wireless frame having its configuration changed, to the mobile station 3 to increase the frequency of allocation of UL slots to the mobile station 3. When the priority of the mobile station 3 is changed, the scheduler allocates UL slots and DL slots to the mobile station 3, taking into account the changed priority to increase the frequency of allocation of UL slots to the mobile station 3 having its priority changed (heightened). Note that, when changing a beam used by a mobile station 3 that is the same beam as a beam used by the mobile station 3 for which the feedback information transmission frequency is desired to be increased, the parameter determining unit 24 can determine the communication parameters to connect the former mobile station to another base station 2. At this time, a beam used by the mobile station having the low priority can be changed, or the base station to which to connect this mobile station can be changed. The parameter determining unit 24 can stop, for a fixed period, allocation of UL slots to the mobile station 3 having the low priority or the mobile station 3 having no problem even if the feedback information transmission frequency for this mobile station decreases.

When the mobile station 3 is transmitting feedback information at a predetermined cycle, the parameter determining unit 24 can determine the communication parameters to instruct the mobile station 3 to shorten the transmission cycle of the feedback information.

When the communication system 100 is configured to be capable of changing an access scheme, the parameter determining unit 24 can determine the communication parameters such that an access scheme in a beam used by the mobile station 3 for which the feedback information transmission frequency is desired to be increased is changed from the TDD to the Frequency Division Duplex (FDD). The change of the access scheme to the FDD can increase the feedback information transmission frequency for the mobile station 3 that performs the communication in the FDD.

When the access scheme is changed from the TDD to the FDD, that is, when the parameter determining unit 24 determines to change the access scheme from the TDD to the FDD, the base station 2 temporarily disconnects communication with the mobile station under the TDD scheme and starts communication under the FDD scheme with the mobile station 3. A control procedure in ending the communication under the TDD scheme and a procedure in starting the communication under the FDD scheme are governed by the communication schemes of the TDD and the FDD employed by the base station 2 and the mobile station 3. When the parameter determining unit 24 determines to change the access scheme from the TDD to the FDD, the base station 2 temporarily disconnects the communication with all of the communicating mobile stations 3, that is, the communication under the TDD scheme, and switches the communication under the TDD scheme to the communication with all of the mobile stations 3 under the FDD scheme, that is, reconnects to and resumes the communication with the mobile stations. After switching the communication under the TDD scheme to the communication under the FDD scheme, when a preset time elapses, the base station 2 checks whether "the number (M) of mobile stations for which the feedback information transmission frequencies are equal to or smaller than the threshold Tt is smaller than the threshold, "Tu>M". When the number M is smaller than the threshold Tu, "Tu>M", the base station 2 resets the communication scheme to the original communication scheme, that is, the TDD scheme. When resetting the communication scheme from the FDD scheme to the TDD scheme, the base station 2 temporarily disconnects the communication with the mobile station 3 under the FDD scheme and starts the communication under the TDD scheme with the mobile station 3.

Although the configuration of the base station 2 is explained above, the base station 1 can include the same functions as the functions of the base station 2.

The operations of the respective units configuring the mobile station 3 are explained hereinbelow.

The feedback-information transmitting unit 31 of the mobile station 3 transmits the above-described feedback information to the base station 2.

Figure 9:
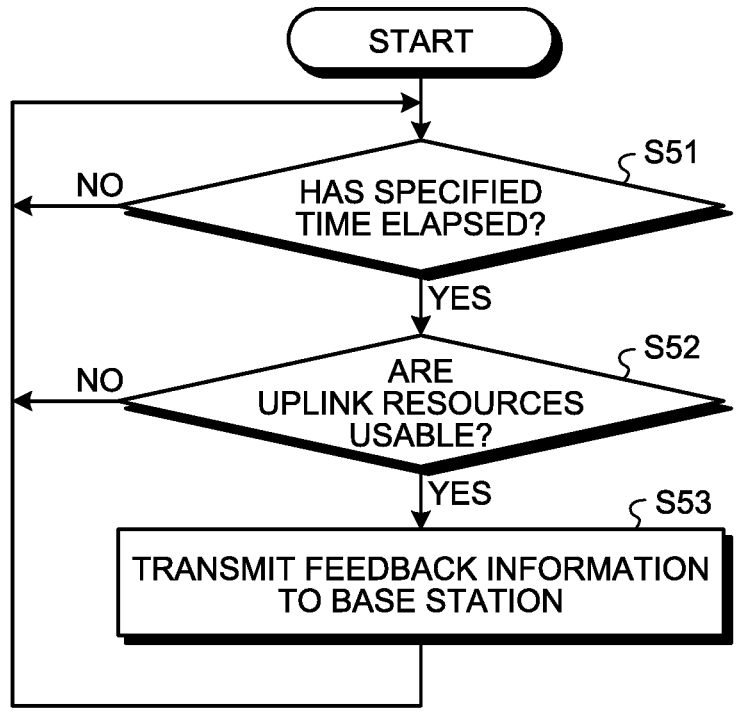
FIG. 9 is a flowchart illustrating an operation example of a feedback-information transmitting unit according to the first embodiment.

FIG. 9 is a flowchart illustrating an operation example of the feedback-information transmitting unit 31.

The feedback-information transmitting unit 31 checks whether a specified time has elapsed (step S51). When the specified time has not elapsed (No at step S51), the feedback-information transmitting unit 31 continues the checking operation. When the specified time has elapsed (Yes at step S51), the feedback-information transmitting unit 31 determines whether uplink resources are usable, that is, whether UL slots usable in the transmission of feedback information are allocated (step S52). When the uplink resources are unusable (No at step S52), the feedback-information transmitting unit 31 returns to step S51. On the other hand, when the uplink resources are usable (Yes at step S52), the feedback-information transmitting unit 31 transmits the feedback information to the base station 2 (step S53) and returns to step S51.

The position-information acquiring unit 32 of the mobile station 3 acquires information concerning the position of the mobile station 3 by, for example, using a Global Positioning System (GPS), and transmits the acquired position information to the base station 2. The position information transmitted to the base station 2 is used in the processing in which the position determining unit 22 determines a position of the mobile station 3 explained above. Note that the mobile station 3 does not have to include the position-information acquiring unit 32. When the mobile station 3 includes the position-information acquiring unit 32, a processing load on the position determining unit 22 of the base station 2 is reduced.

Figure 10:
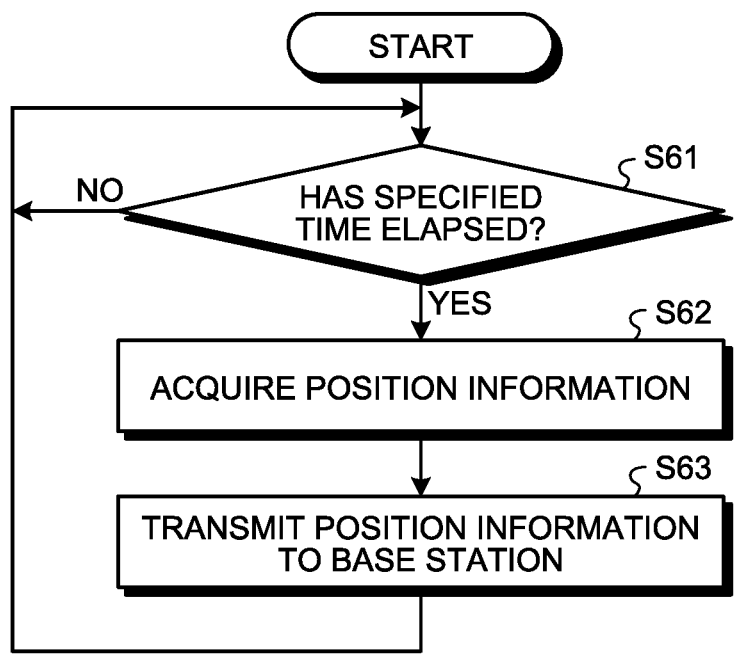
FIG. 10 is a flowchart illustrating an operation example of a position-information acquiring unit according to the first embodiment.

FIG. 10 is a flowchart illustrating an operation example of the position-information acquiring unit 32.

The position-information acquiring unit 32 checks whether a specified time has elapsed (step S61). When the specified time has not elapsed (No at step S61), the position-information acquiring unit 32 continues the checking operation. When the specified time has elapsed (Yes at step S61), the position-information acquiring unit 32 acquires position information on the mobile station 3 (step S62) and transmits the acquired position information to the base station 2 (step S63). After executing step S63, the position-information acquiring unit 32 returns to step S61.

Hardware configurations of the base station 2 and the mobile station 3 having the configurations explained above are explained.

Figure 11:
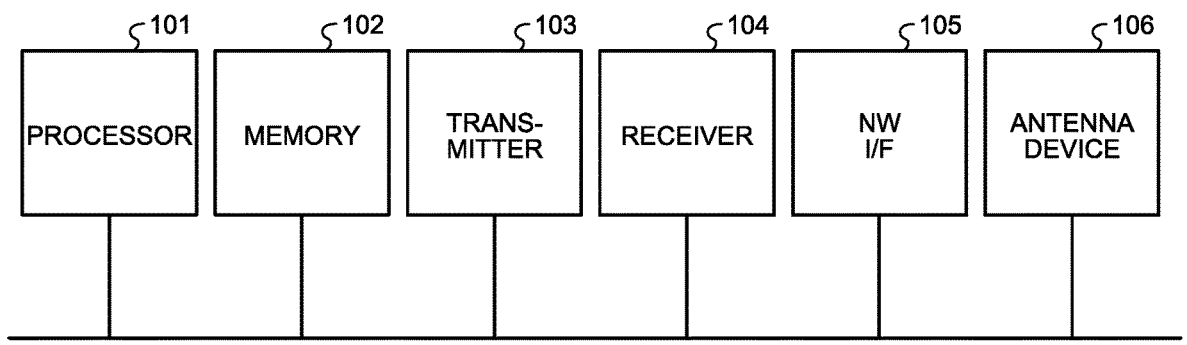
FIG. 11 is a diagram illustrating an example of a hardware configuration for implementing the base station according to the first embodiment.

The base station 2 according to this embodiment can be implemented by, for example, hardware having a configuration illustrated in FIG. 11. FIG. 11 is a diagram illustrating an example of a hardware configuration for implementing the base station 2 according to the first embodiment. The base station 2 can be implemented by, for example, a processor 101, a memory 102, a transmitter 103, a receiver 104, a network interface (NW I/F) 105, and an antenna device 106.

The processor 101 is a Central Processing Unit (CPU; also referred to as central processing device, processing device, arithmetic device, microprocessor, microcomputer, processor, and DSP), a system Large Scale Integration (LSI), or the like. The memory 102 is a nonvolatile or volatile semiconductor memory such as a Random Access Memory (RAM), a Read Only Memory (ROM), a flash memory, or an Erasable Programmable Read Only Memory (EEPROM), a magnetic disk, a flexible disk, an optical disk, a compact disk, a mini disk, a Digital Versatile Disc (DVD), or the like.

The information-reception-frequency calculating unit 21, the position determining unit 22, the mobile-station-information acquiring unit 23, and the parameter determining unit 24 of the base station 2 are implemented by the processor 101 and programs stored in the memory 102. Specifically, the information-reception-frequency calculating unit 21, the position determining unit 22, the mobile-station-information acquiring unit 23, and the parameter determining unit 24 are implemented by the processor 101 reading out from the memory 102 and executing the programs for operating as the information-reception-frequency calculating unit 21, the position determining unit 22, the mobile-station-information acquiring unit 23, and the parameter determining unit 24.

The base station 2 uses the transmitter 103 illustrated in FIG. 11 when transmitting a radio signal to the mobile station 3. The base station 2 uses the receiver 104 when receiving a radio signal transmitted from the mobile station 3. The base station 2 uses the network interface 105 when communicating with the NW node 10. The base station 2 uses the antenna device 106 when communicating with the mobile station 3. The antenna device 106 is capable of forming a beam toward a communication partner mobile station 3 and transmitting and receiving radio signals to and from the mobile station 3.

Figure 12:
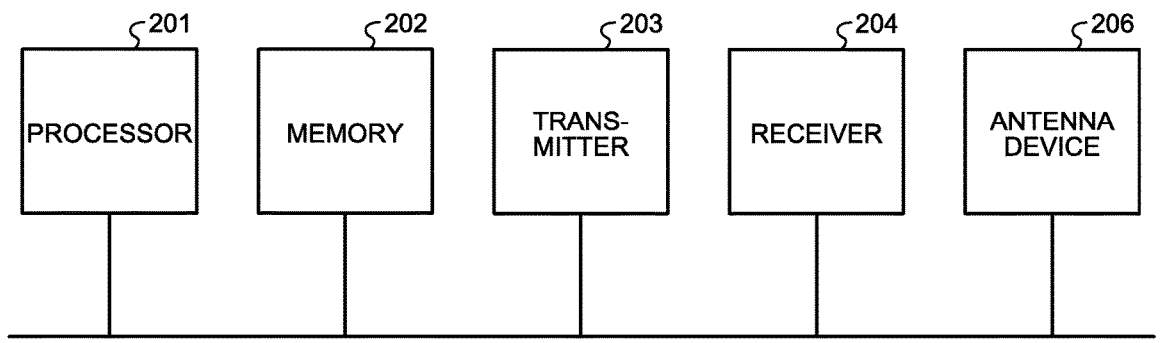
FIG. 12 is a diagram illustrating an example of a hardware configuration for implementing the mobile station according to the first embodiment.

The mobile station 3 according to this embodiment can be implemented by, for example, hardware having a configuration illustrated in FIG. 12. FIG. 12 is a diagram illustrating an example of a hardware configuration for implementing the mobile station 3 according to the first embodiment. The mobile station 3 can be implemented by, for example, a processor 201, a memory 202, a transmitter 203, a receiver 204, and an antenna device 206. Note that the processor 201 and the memory 202 are the same as the processor 101 and the memory 102 explained above.

The feedback-information transmitting unit 31 and the position-information acquiring unit 32 of the mobile station 3 are implemented by the processor 201 and programs stored in the memory 202. Specifically, the feedback-information transmitting unit 31 and the position-information acquiring unit 32 are implemented by the processor 201 reading out from the memory 202 and executing the programs for operating as the feedback-information transmitting unit 31 and the position-information acquiring unit 32.

The mobile station 3 uses the transmitter 203 when transmitting a radio signal to the base station 2. The mobile station 3 uses the receiver 204 when receiving a radio signal transmitted from the base station 2. The mobile station 3 uses the antenna device 206 when communicating with the base station 2. Note that the antenna device 206 does not form a beam.

Note that a part or all of the components of the base station 2 can be implemented by a processing circuit, which is dedicated hardware. When the components of the base station 2 are implemented by the dedicated hardware, the processing circuit, which is the dedicated hardware, is, for example, a single circuit, a composite circuit, a programmed processor, a parallel-programmed processor, an Application Specific Integrated Circuit (ASIC), a Field Programable Gate Array (FPGA), or a combination thereof. Similarly, a part or all of the components of the mobile station 3 can be implemented by a processing circuit, which is dedicated hardware.

Figure 13:
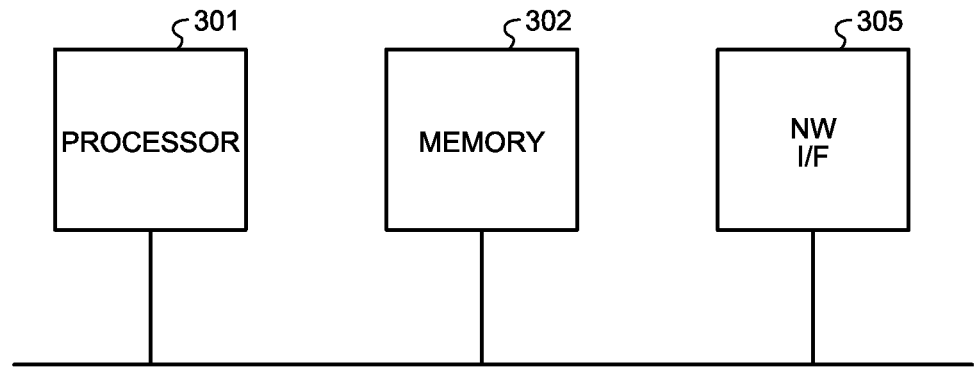
FIG. 13 is a diagram illustrating an example of a hardware configuration for implementing a network node according to the first embodiment.

Although, in this embodiment, the NW node 10 is not limited to a particular element but is a communication apparatus that performs communication with the base station 2 by wire, the NW node 10 can be implemented by, for example, a processor 301, a memory 302, and a network interface (NW I/F) 305 illustrated in FIG. 13. The processor 301, the memory 302, and the network interface 305 are the same as the processor 101, the memory 102, and the network interface 105 explained above. Functions of the NW node 10 are implemented by the processor 301 reading out programs for realizing the functions from the memory 302 and executing the programs. The NW node 10 uses the network interface 305 when communicating with the base station 2.

As explained above, on the basis of the feedback information transmission frequency of each of the communicating mobile stations 3, the number of regions where the communicating mobile stations 3 are present, and the average of the number of the mobile stations 3 allocated to one UL slot, the base station 2 according to this embodiment determines whether there is the mobile station 3 for which the feedback information transmission frequency needs to be increased. When there is the mobile station 3 for which the feedback information transmission frequency needs to be increased, the base station 2 changes at least one of the communication parameters that affect the scheduling, such that a frequency of allocation of UL slots to the mobile station 3 in question increases. This increase the frequency of allocation of UL slots to the mobile station 3 for which the feedback information transmission frequency is desired to be increased. As a result, the feedback information transmission frequency can be increased. The feedback information is information necessary in processing for improving or maintaining the wireless communication quality such as processing for forming the beam, processing for changing the modulation scheme in use, and processing for changing the encoding rate in use. By increasing the feedback information transmission frequency, the deterioration of the quality of communication with the mobile station 3 can be prevented. As a result, a higher throughput can be expected. Higher user satisfaction can be acquired.

Using a result of comparison of the feedback information transmission frequency with the threshold Tt, the parameter determining unit 24 in this embodiment determines whether it is necessary to increase the feedback information transmission frequency, that is, whether a change to the communication parameters is necessary. Alternatively, the parameter determining unit 24 can make this determination by using a moving speed or acceleration of the mobile station 3. In this case, the parameter determining unit 24 uses a result of comparison of the moving speed or the acceleration with a threshold to determine whether it is necessary to increase the feedback information transmission frequency. Occurrence of a sudden change in behavior of movement of the mobile station 3 or a high-speed movement of the mobile station 3 makes more likely that a radio line state undergoes an abrupt change. As a result, some mobile station 3 would deteriorate in radio quality indicated by a Carrier to Interference plus Noise Ratio (CINR), a Bit Error Rate (BER), or the like. The moving speed or acceleration of the mobile station 3 is used to determine whether it is necessary to increase the feedback information transmission frequency. It is thus possible to avoid the deterioration of the radio quality due to the abrupt change in the radio line state when the sudden change in the behavior of the movement or the high-speed movement occurs. As a result, a higher throughput can be expected. Higher user satisfaction can be acquired.

The parameter determining unit 24 can execute both an operation for determining, on the basis of the result of comparison of the feedback information transmission frequency with the threshold Tt, whether the change to the communication parameters is necessary and an operation for determining, on the basis of the moving speed or acceleration of the mobile station 3, whether the change to the communication parameters is necessary.

Second Embodiment

Figure 14:
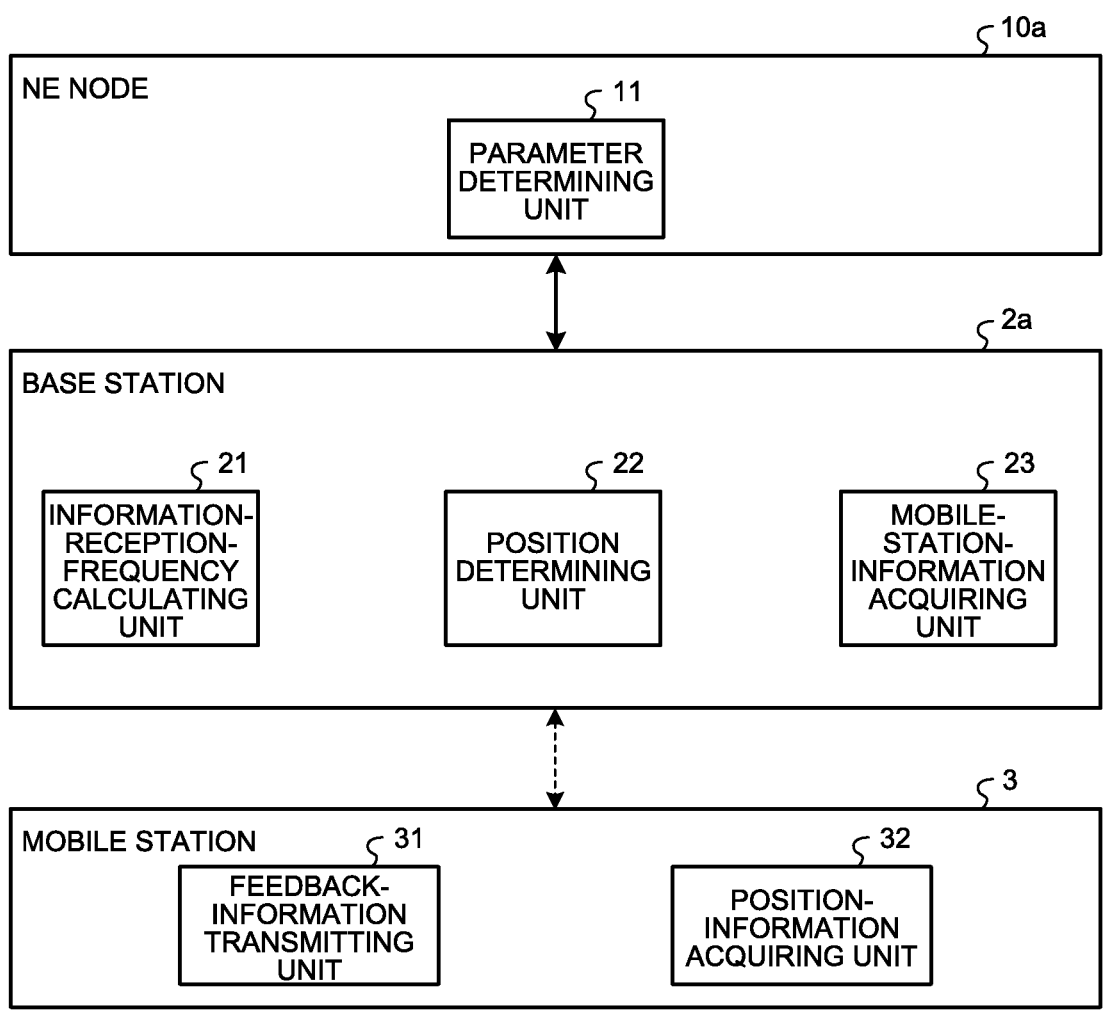
FIG. 14 is a diagram illustrating a configuration example of a base station, a mobile station, and a NW node according to a second embodiment.

The NW node 10 can include a part of the components of the base station 2 according to the first embodiment illustrated in FIG. 2, as illustrated in, for example, FIG. 14.

FIG. 14 is a diagram illustrating a configuration example of a base station, a mobile station, and a NW node according to a second embodiment. A base station 2a according to this embodiment is the base station 2 according to the first embodiment with the parameter determining unit 24 deleted. A NW node 10a according to this embodiment includes a parameter determining unit 11 equivalent to the parameter determining unit 24 of the base station 2 according to the first embodiment. The mobile station 3 according to this embodiment and the mobile station 3 according to the first embodiment have the same configuration.

The information-reception-frequency calculating unit 21, the position determining unit 22, and the mobile-station-information acquiring unit 23 of the base station 2a are the same as the information-reception-frequency calculating unit 21, the position determining unit 22, and the mobile-station-information acquiring unit 23 of the base station 2 according to the first embodiment.

The parameter determining unit 11 of the NW node 10a acquires necessary information from the base station 2a and executes the same processing as the processing executed by the parameter determining unit 24 of the base station 2 according to the first embodiment. Note that the plurality of base stations 2 are present as illustrated in FIG. 1. Therefore, the parameter determining unit 11 executes the same processing for each of the base stations 2 and determines the communication parameters in each of the base stations 2. When a large number of the mobile stations 3 communicating with a specific base station 2a are present and the number of the mobile stations 3 communicating with the other base stations 2a is small, the parameter determining unit 11 can determine that a part of the mobile stations 3 communicating with the specific base station 2a is handed over to another base stations 2a located around the specific base station 2a. In this case, the base stations 2a and the mobile stations 3 execute the handover processing in accordance with a procedure specified by the LTE, the LTE-Advanced, or the like.

A communication system according to this embodiment is the same as the communication system 100 according to the first embodiment except that the NW node 10a includes, as the parameter determining unit 11, the parameter determining unit 24 of the base station 2 according to the first embodiment. Thus, detailed explanation of the communication system is omitted.

Note that the base station 2a according to this embodiment can be implemented by the hardware having the configuration illustrated in FIG. 11. The NW node 10a can be implemented by the hardware having the configuration illustrated in FIG. 12.

Therefore, the configuration illustrated in FIG. 14 achieves the same effect as the effect in the first embodiment.

Note that, like the parameter determining unit 24 in the first embodiment, the parameter determining unit 11 can determine, on the basis of the moving speed or acceleration of the mobile station 3, whether a change to the communication parameters is necessary. The parameter determining unit 11 can be configured to execute both an operation for determining, on the basis of a result of comparison of the feedback information transmission frequency with the threshold Tt, whether a change to the communication parameters is necessary and an operation for determining, on the basis of the moving speed or acceleration of the mobile station 3, whether a change to the communication parameters is necessary.

Third Embodiment

Figure 15:
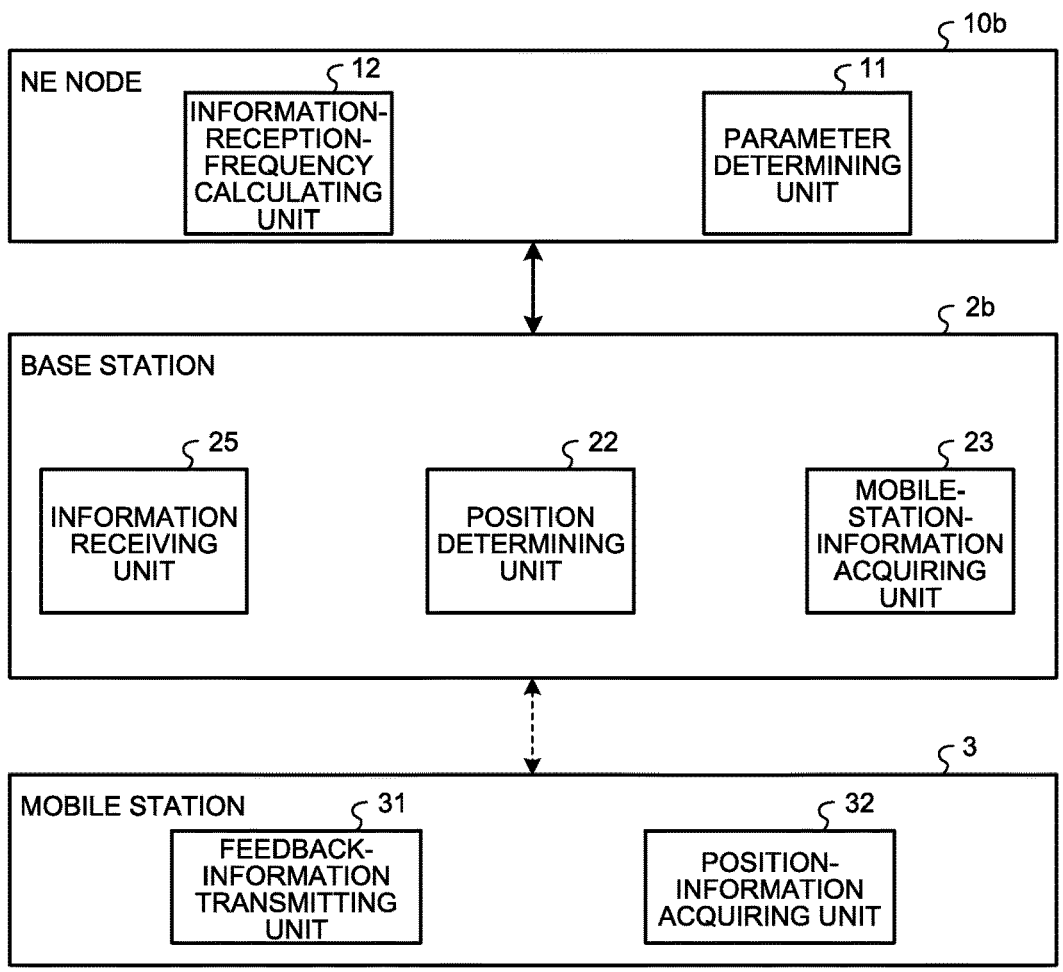
FIG. 15 is a diagram illustrating a configuration example of a base station, a mobile station, and a NW node according to a third embodiment.

FIG. 15 is a diagram illustrating a configuration example of a base station, a mobile station, and a NW node according to a third embodiment. A base station 2b according to this embodiment is the base station 2a according to the second embodiment with the information-reception-frequency calculating unit 21 deleted and an information receiving unit 25 added. A NW node 10b according to this embodiment differs from the NW node 10a according to the second embodiment in that an information-reception-frequency calculating unit 12 equivalent to the information-reception-frequency calculating unit 21 of the base station 2a according to the second embodiment is added. The mobile station 3 according to this embodiment and the mobile station 3 according to the first and second embodiments have the same configuration.

The position determining unit 22 and the mobile-station-information acquiring unit 23 of the base station 2b are the same as the position determining unit 22 and the mobile-station-information acquiring unit 23 of the base station 2 according to the first embodiment.

The information receiving unit 25 of the base station 2b receives the feedback information from each of the communicating mobile stations 3. When receiving the feedback information, the information receiving unit 25 notifies the NW node 10b accordingly.

Figure 16:
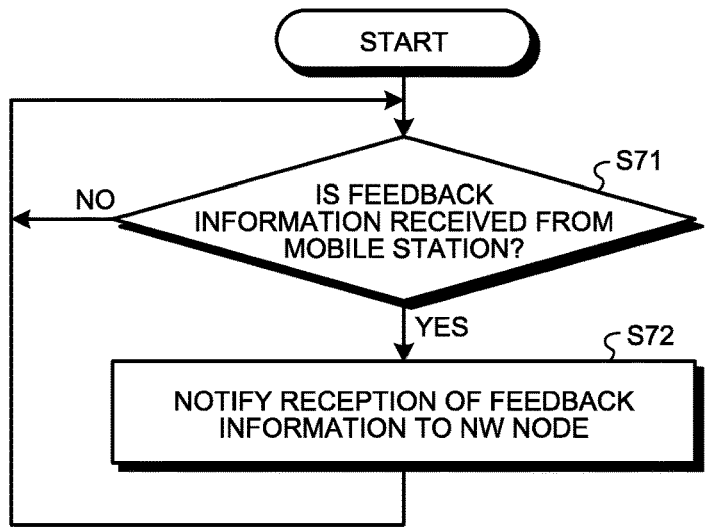
FIG. 16 is a flowchart illustrating an operation example of an information receiving unit according to the third embodiment.

FIG. 16 is a flowchart illustrating an operation example of the information receiving unit 25.

The information receiving unit 25 checks whether the feedback information is received from the mobile station 3 (step S71). When feedback information is not received (No at step S71), the information receiving unit 25 continues the checking operation. When the feedback information is received (Yes at step S71), the information receiving unit 25 notifies the NW node 10b that the feedback information is received (step S72). At this time, the information receiving unit 25 also notifies an ID of the mobile station that is a source of the transmission of the feedback information.

When receiving the notification of the reception of the feedback information and the ID of the mobile station that is the transmission source of the feedback information, the information-reception-frequency calculating unit 12 of the NW node 10b executes the same processing as the processing executed by the information-reception-frequency calculating unit 21 of the base station 2 according to the first embodiment, specifically, the same processing as the processing at steps S12 and S13 illustrated in FIG. 3.

A communication system according to this embodiment is the same as the communication system according to the first or second embodiment except that the NW node 10b includes, as the information-reception-frequency calculating unit 12, the information-reception-frequency calculating unit 21 of the base station 2a according to the second embodiment and the base station 2b includes the information receiving unit 25. Thus, detailed explanation of the communication system is omitted.

Note that the base station 2b according to this embodiment can be implemented by the hardware having the configuration illustrated in FIG. 11. The NW node 10b can be implemented by the hardware having the configuration illustrated in FIG. 12.

Therefore, the configuration illustrated in FIG. 15 achieves the same effect as the effect in the first and second embodiments.

The configurations explained above in the embodiments indicate examples of the content of the present invention. The configurations can be combined with other publicly-known technologies. A part of the configurations can be omitted or changed in a range not departing from the spirit of the present invention.

REFERENCE SIGNS LIST 10 base station (MeNB); 2, 2a, 2b base station (SeNB); 3 mobile station; 10, 10a, 10b NW node; 11, 24 parameter determining unit; 12, 21 information-reception-frequency calculating unit; 22 position determining unit; mobile-station-information acquiring unit; 25 information receiving unit; 31 feedback-information transmitting unit; 32 position-information acquiring unit.

The invention claimed is:

1. A radio base station of a communication system employing a time division multiplex scheme, the radio base station communicating with mobile stations by using a beam, the radio base station comprising:
- an information-reception-frequency calculator to determine, on a per mobile-station basis, frequencies of reception of feedback information from the mobile stations, the feedback information including at least one kind of information among information necessary for forming the beam, information necessary for determining a modulation scheme in use, and information necessary for determining an encoding rate in use;
- a position determiner to determine in which region of a plurality of regions obtained by dividing an area covered by the radio base station, the mobile stations are present; and
- a parameter determiner to determine whether it is necessary to change a communication parameter, on a basis of the number of the mobile stations for which the frequencies determined by the information-reception-frequency calculator are equal to or smaller than a threshold, the number of the regions where the mobile stations are present, and an average of the number of the mobile stations allocated to one slot for uplink communication, the communication parameter affecting frequencies with which the mobile stations transmit the feedback information, the parameter determiner determining a new setting value of the communication parameter when it is necessary to change the communication parameter.

2. The radio base station according to claim 1, wherein, when the parameter determiner determines that the change to the communication parameter is necessary, the parameter determiner determines the new setting value of the communication parameter so as to increase a frequency of allocation of the slot for uplink communication to the mobile station for which the frequency is equal to or smaller than the threshold.

3. The radio base station according to claim 2, wherein, when the parameter determiner determines that the change to the communication parameter is necessary, the parameter determiner determines to make the number of the slots for uplink communication included in one wireless frame, larger than the current number of slots.

4. The radio base station according to claim 2, wherein, when the parameter determiner determines that the change to the communication parameter is necessary, the parameter determiner determines to make a priority of the mobile station for which the frequency is equal to or smaller than the threshold, higher than a current priority.

5. The radio base station according to claim 2, wherein, when the parameter determiner determines that the change to the communication parameter is necessary, the parameter determiner determines to make a priority of the mobile station for which the frequency is larger than the threshold, lower than a current priority.

6. The radio base station according to claim 2, wherein, when the parameter determiner determines that the change to the communication parameter is necessary, the parameter determiner determines that the mobile station using the same beam as a beam used by the mobile station for which the frequency is equal to or smaller than the threshold uses another beam.

7. The radio base station according to claim 2, wherein, when the parameter determiner determines that the change to the communication parameter is necessary, the parameter determiner determines to stop, for a fixed period, the allocation of the slot for uplink communication to the mobile station for which the frequency is larger than the threshold.

8. The radio base station according to claim 2, wherein, when the parameter determiner determines that the change to the communication parameter is necessary, the parameter determiner determines to stop, for a fixed period, the allocation of the slot for uplink communication to the mobile station having a low priority.

9. The radio base station according to claim 2, wherein, when the parameter determiner determines that the change to the communication parameter is necessary, the parameter determiner determines to change an access scheme to a frequency division multiplex scheme.

10. The radio base station according to claim 1, wherein the position determiner determines a region where the mobile station is present, on the basis of a reception intensity of a signal in the mobile station, the signal being transmitted by a beam formed toward each of the regions.

11. The radio base station according to claim 1, wherein, when the mobile station has a function of acquiring information concerning a position of the mobile station, the position determiner acquires the information concerning the position from the mobile station and determines a region where the mobile station is present, on the basis of the acquired information concerning the position.

12. The radio base station according to claim 1, wherein the parameter determiner determines whether it is necessary to change the communication parameter, on the basis of moving speed or acceleration of the mobile station.

13. A communication system comprising:
- a radio base station of the communication system employing a time division multiplex scheme, the radio base station communicating with mobile stations by using a beam; and
- a network node to communicate with the radio base station by wire, wherein
- the radio base station includes:
  - an information-reception-frequency calculator to determine, on a per mobile-station basis, frequencies of reception of feedback information from the mobile stations, the feedback information including at least one kind of information among information necessary for forming the beam, information necessary for determining a modulation scheme in use, and information necessary for determining an encoding rate in use; and
  - a position determiner to determine in which region of a plurality of regions obtained by dividing an area covered by the radio base station, the mobile stations are present, and
- the network node includes a parameter determiner to determine whether it is necessary to change a communication parameter, on a basis of the number of the mobile stations for which the frequencies determined by the information-reception-frequency calculator are equal to or smaller than a threshold, the number of the regions where the mobile stations are present, and an average of the number of the mobile stations allocated to one slot for uplink communication, the communication parameter affecting frequencies with which the mobile stations transmit the feedback information, the parameter determiner determining a new setting value of the communication parameter when it is necessary to change the communication parameter.

14. A communication system comprising:
- a radio base station of the communication system employing a time division multiplex scheme, the radio base station communicating with mobile stations by using a beam; and a network node to perform communication with the radio base station by wire, wherein the radio base station includes:

an information receiver to notify the network node of reception of feedback information when the information receiver receives the feedback information from the mobile station, the feedback information including at least one kind of information among information necessary for forming the beam, information necessary for determining a modulation scheme in use, and information necessary for determining an encoding rate in use; and a position determiner to determine in which region of a plurality of regions obtained by dividing an area covered by the radio base station, the mobile stations are present, and the network node includes:

an information-reception-frequency calculator to determine, on a per mobile-station basis, frequencies with which the radio base station receives the feedback information from the mobile stations; and a parameter determiner to determine whether it is necessary to change a communication parameter, on a basis of the number of the mobile stations for which the frequencies determined by the information-reception-frequency calculator are equal to or smaller than a threshold, the number of the regions where the mobile stations are present, and an average of the number of the mobile stations allocated to one slot for uplink communication, the communication parameter affecting frequencies with which the mobile stations transmit the feedback information, the parameter determiner determining a new setting value of the communication parameter when it is necessary to change the communication parameter.

* * * * *